United States Patent [19]

Butler et al.

[11] 4,068,804
[45] Jan. 17, 1978

[54] METHOD AND MACHINE FOR TEARING APART STACKED CROP MATERIAL BALES

[75] Inventors: L. Dennis Butler; Gene R. Butler, both of Kingsburg; Anthony E. Furtado, Riverdale; Jerry W. Welker, Fresno; Donald M. Grey, Selma, all of Calif.

[73] Assignee: Sperry Rand Corporation, New Holland, Pa.

[21] Appl. No.: 643,045

[22] Filed: Dec. 22, 1975

Related U.S. Application Data

[62] Division of Ser. No. 467,359, May 6, 1974.

[51] Int. Cl.$^2$ .............................................. A01C 3/06
[52] U.S. Cl. ............................... 241/101.7; 241/282; 214/8.5 A; 239/651; 239/679
[58] Field of Search .................. 214/6 B, 8.5 F, 8.5 A, 214/8.5 SS, 518, 510, 519, 8 F; 239/672, 679, 651, 650, 666; 241/186 R, 101.7, 186.1, 282, 186.2, 186.3, 191

[56] References Cited

U.S. PATENT DOCUMENTS

| | | | |
|---|---|---|---|
| 3,129,739 | 4/1964 | Wenger | 241/186 R |
| 3,208,491 | 9/1965 | Bliss | 241/186 R X |
| 3,401,810 | 9/1968 | Grey | 214/6 B |
| 3,510,013 | 5/1970 | Best | 214/6 B |
| 3,631,992 | 1/1972 | Dickinson | 214/6 B |
| 3,656,638 | 4/1972 | Hutton | 214/83.14 X |

FOREIGN PATENT DOCUMENTS

| | | | |
|---|---|---|---|
| 512,003 | 6/1952 | Belgium | 239/679 |

*Primary Examiner*—John J. Love
*Attorney, Agent, or Firm*—John R. Flanagan; Frank A. Seemar; John B. Mitchell

[57] ABSTRACT

A machine for tearing apart stacked crop material bales has a pivotal load bed with stack clamping mechanisms arranged about the bed for retrieving a stack of crop material bales by placing the load bed in an upright retrieving position, moving the upright load bed alongside the stack, actuating the clamp mechanisms to engage and retain the bale stack against the load bed and then pivoting the load bed with the stack retained thereon from the upright position to a horizontal position. A fore-and-aft moveable rolling rack mounted transversely across the load bed will advance the entire stack longitudinally along the load bed from time to time to position a leading vertical transversely-extending tier of bales, in a succession of such vertical tiers which form the stack, onto a horizontal platform positioned along one end of the load bed. A pusher or feeder mechanism is disposed along the platform and moveable transversely between a lateral side of the platform and a shredding drum being rotatably mounted about a vertical axis and disposed laterally outwardly from an opposite side of the platform. Movement of the pusher mechanism toward the shredding drum causes endwise feeding of the leading vertically standing, transverse tier of bales into the shredding drum. A deflector shroud partially surrounding and covering the vertical shredding drum assists in guiding or directing the shredded, loose crop material to a desired feeding location alongside the machine.

10 Claims, 18 Drawing Figures

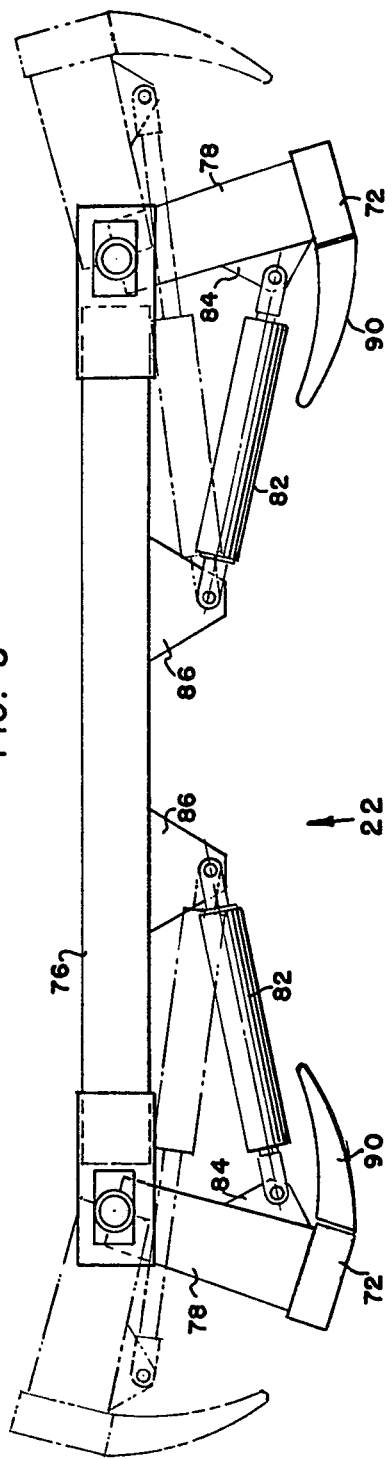
FIG. 3
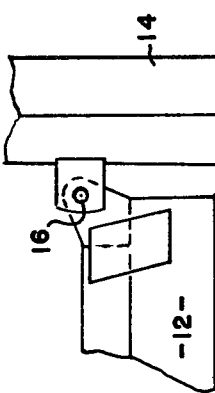
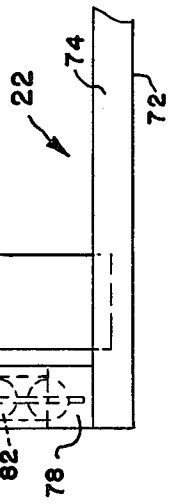
FIG. 5
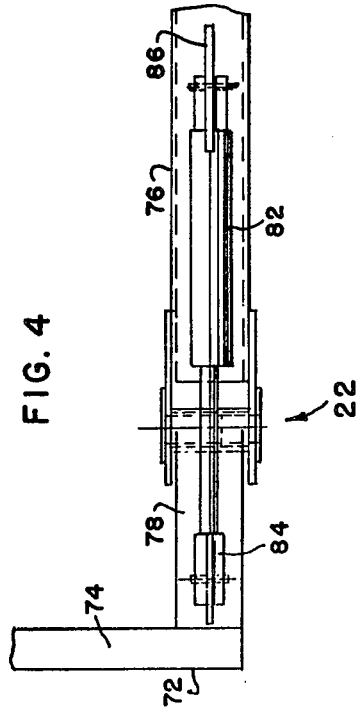
FIG. 4

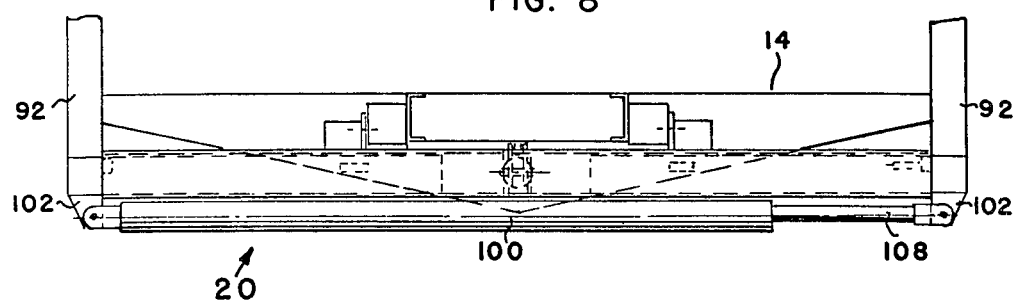
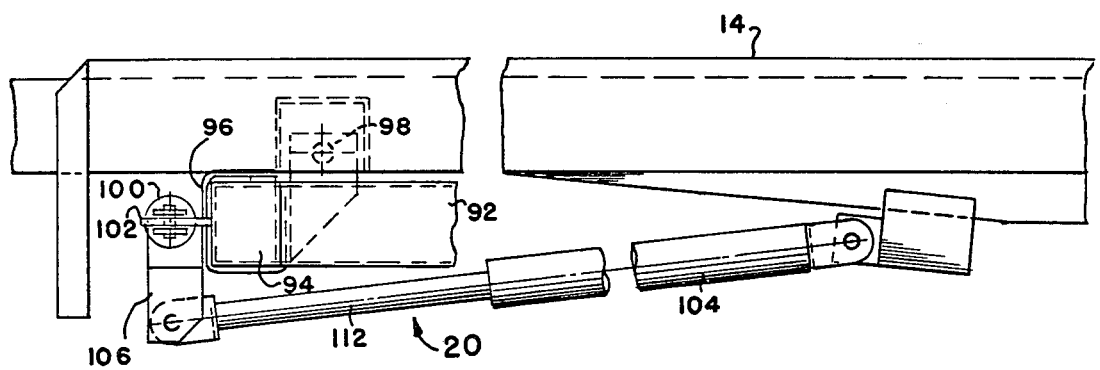
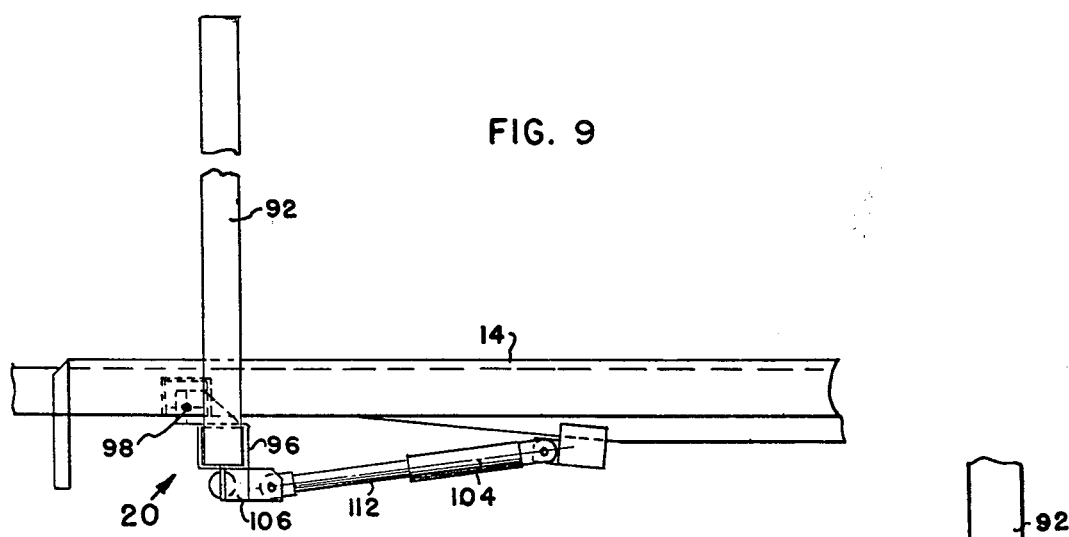
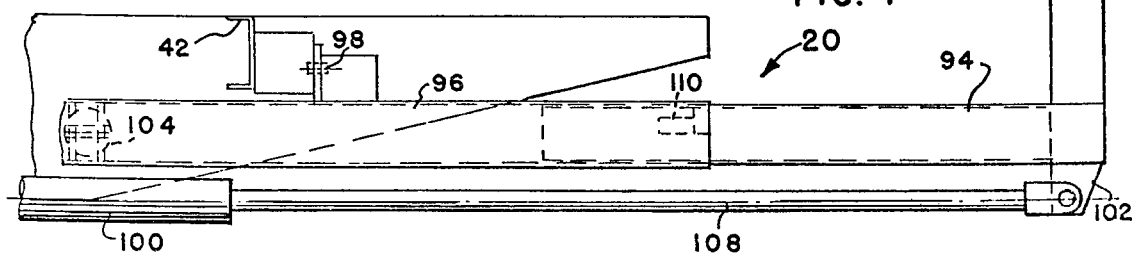

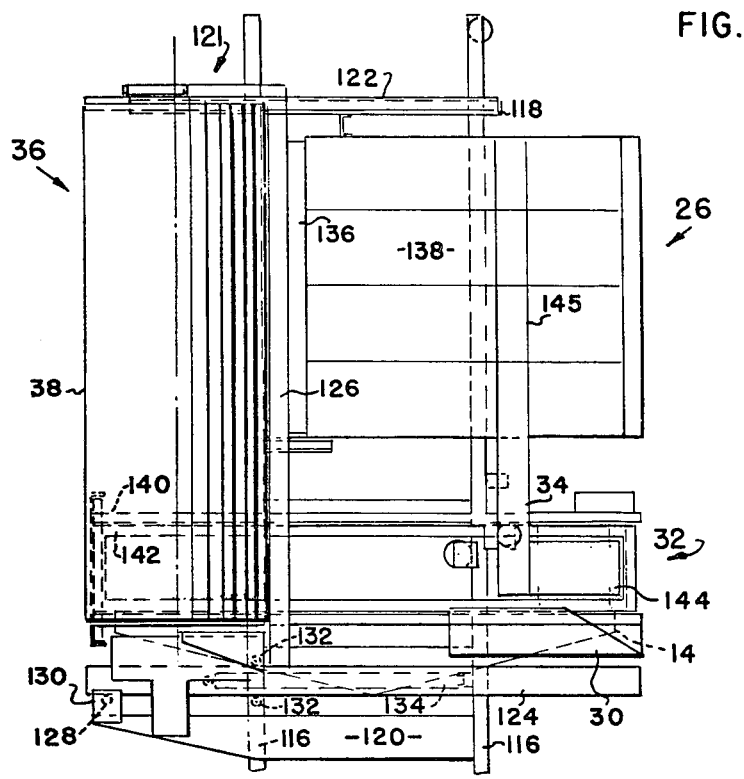
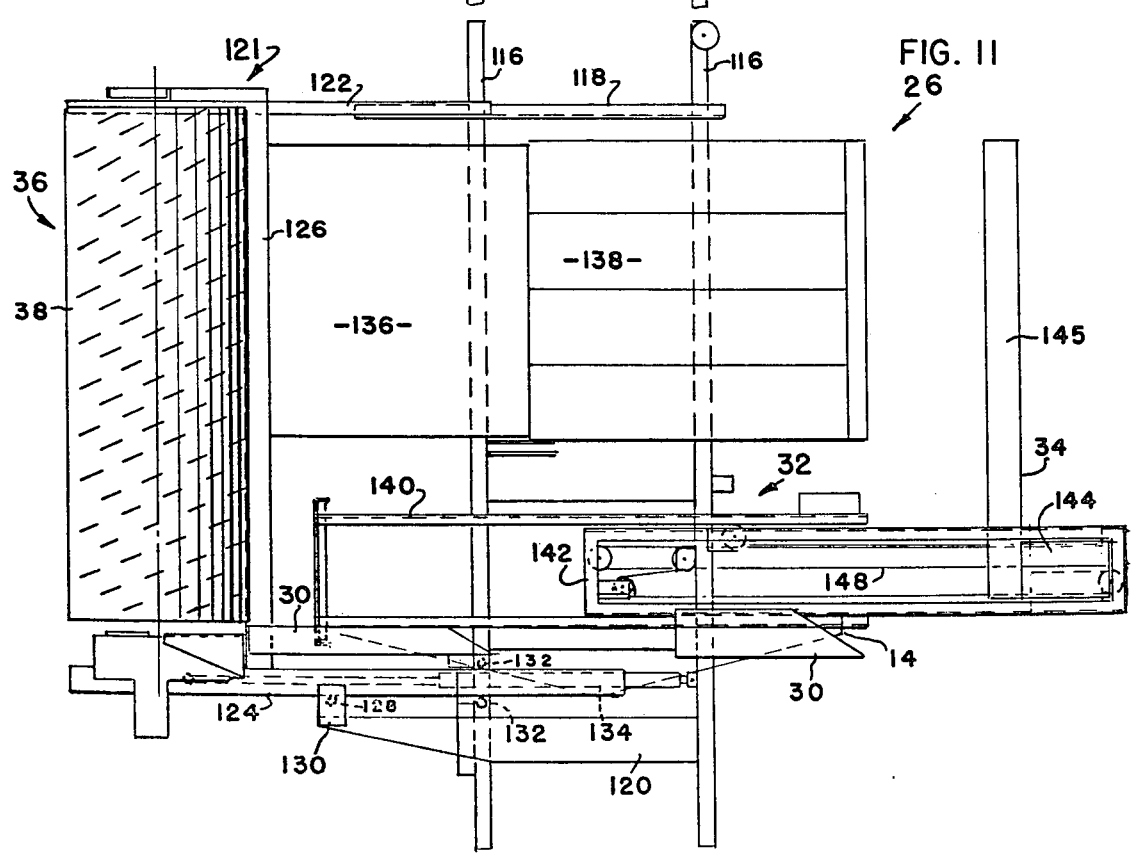

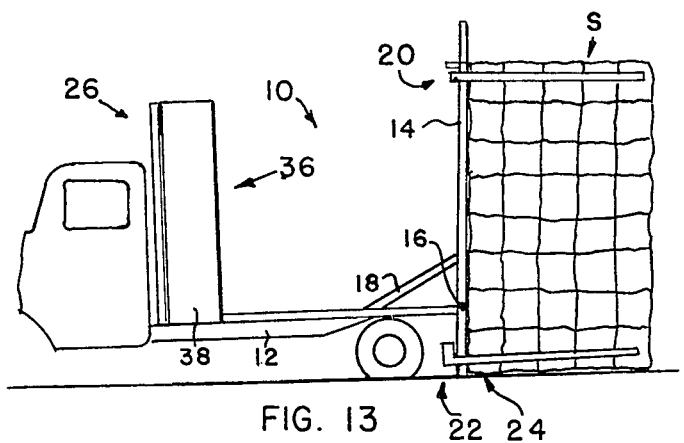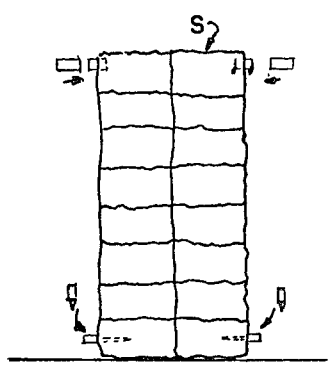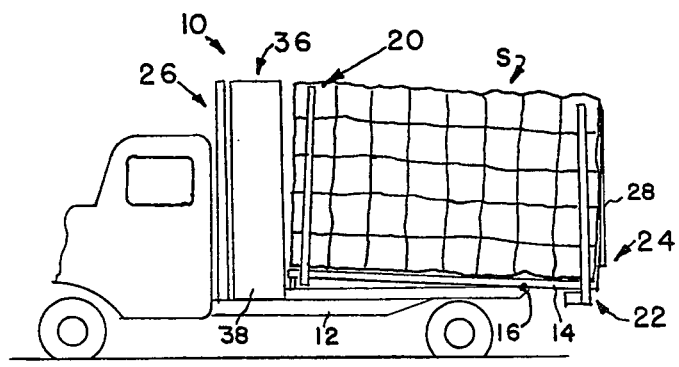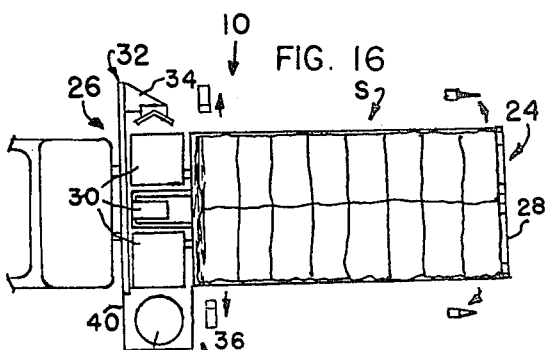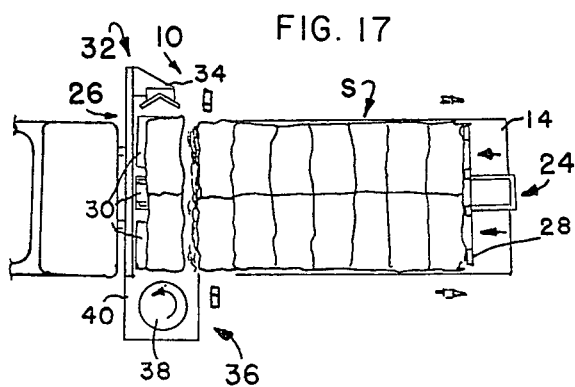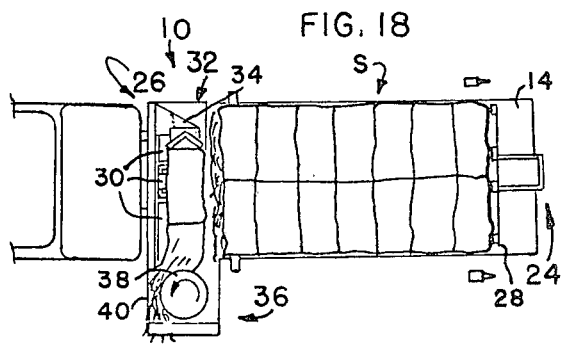

METHOD AND MACHINE FOR TEARING APART STACKED CROP MATERIAL BALES

This is a division, of application Ser. No. 467,359, filed May 6, 1974.

BACKGROUND OF THE INVENTION

1. Field of the Invention

The present invention relates generally to the art of feeding loose crop material from bales thereof and, more particularly, is concerned with a method and machine for tearing apart stacked crop material bales.

2. Description of the Prior Art

Crop material such as hay or the like in its loose form is one of the standard feed materials for livestock. However, it is accepted present day practice to harvest hay in the field by forming it into small compact rectangular bales which are then stored in large stacks until needed for subsequent use as feed for the livestock. Consequently, the bales of hay must be broken up when they are subsequently fed to the livestock.

Under traditional feeding practices, a lot of hand labor is employed in breaking up the bales and shaking out the hay into loose form as the bales are deposited into feed bunks or onto ground feeding areas. In recent years, the availability of hay handling labor has become more scarce and labor costs have steadily risen.

Therefore, there is presently a growing need for a machine that would in some manner automatically, without the assistance of hand labor, breakup or tear apart the bales and feed out the hay or other crop material, forming the bales, in loose form at the feeding location.

SUMMARY OF THE INVENTION

The present invention broadly comprises, in a method of tearing apart crop material bales in a stack thereof, the steps of longitudinally aligning the stacked bales with an upstanding crop material bale shredder, operating the shredder by rotating the shredder about a vertical axis, and feeding the stacked bales as a unit endwise into the rotating shredder. Further, as the crop material bale is shredded, the shredded material is confined so as to feed the material out from the shredder at a predetermined location about the shredder.

More particularly, a stack of crop material bales is moved in a first direction to align a leading portion of the stack with the shredder, next the leading stack portion is fed in a second direction into the shredder which direction is generally transverse to the first direction of stack movement, and then the longitudinal stack moving and transverse leading stack portion feeding steps are repeated until the entire bale stack has been torn apart.

Still more particularly, when a load bed is utilized in carrying out the aforementioned steps, prior to the performance of these steps, the stack is loaded on the load bed by positioning the load bed in an upright position adjacent a side of the stack, retaining the stack against the load bed and then pivotally moving the load bed with the stack being retained thereagainst from the upright position to a generally horizontal position.

The present invention further broadly comprises, in a machine for tearing apart crop material bales in a stack thereof, the combination of a generally horizontally-positioned platform for supporting the stacked bales, an upstanding crop material bale shredder rotatably mounted about a vertical axis adjacent the platform, means for longitudinally aligning the stacked bales with the shredder, and means for feeding the stacked bales as a unit endwise into the rotating shredder. Further, shroud means is positioned partially about the shredder for confining the shredded crop material so as to feed the material out from the shredder at a predetermined location about the shredder.

More particularly, the shredder is mounted adjacent one end of the platform with the aligning means being located along one side of the platform extending between the one end and an opposite end thereof. The feeding means comprises track means mounted along an opposite side of the platform extending between the ends thereof. The feeding means further comprises pusher means mounted on the track means to extend outwardly therefrom toward the one platform side in overlying relation to the platform. The pusher means is moveable along the track means between a position adjacent the opposite platform end remote from the shredder wherein the stacked bales may be positioned between the pusher means and the shredder and a position adjacent the shredder such that in moving to the latter position toward the shredder from the position remote therefrom the pusher means feeds the stacked bales as a unit endwise into the rotating shredder.

Still more particularly, a machine having a mobile chassis is provided with a load bed pivotally mounted near its one end to the chassis and movable between a generally horizontal position and a generally upright retrieving position in which the load bed may be disposed generally against a side of the bale stack. Means are arranged about the load bed for retaining the stack against the load bed when the load bed is disposed in its upright position against the stack side and is moved from its upright position to its horizontal position. Means for tearing apart crop material bales is mounted to the chassis adjacent an opposite other end of the load bed when the load bed is disposed in its horizontal position. The load bed mounts means for advancing the stack longitudinally therealong toward the bale tearing means when the load bed is disposed in its horizontal position.

Still further, more particularly, the stack retaining means comprise a pair of stack supporting arms mounted upright and adjacent respective opposite corners of the one load bed end and a pair of stack clamping arms mounted upright and adjacent respective opposite corners of the opposite other load bed end.

The method and machine of the present invention provide for retrieving an entire stack of crop material bales, systematically tearing the bales apart and feeding the loose crop material out at a desired feeding area, all operations being relatively automatically accomplished without the assistance of hand labor in handling the bales.

Furthermore, the mobile machine is readily adapted to normal highway use for transporting a stack from a distant bale storage location to a desired local feeding area. During such transporting of the stack, the bale feeding and shredding mechanisms, which normally extend beyond the overall machine width when in use, are disposed in respective storage positions within the machine width such that the overall machine width does not exceed the maximum highway width allowed by law without special highway use permits and the like. Also, the feeding and shredding mechanisms may be moved between their respective operating and storage positions without interference with the stack of bales being carried on the machine load bed.

Additionally, the mobile machine may be driven forwardly, such as along a row of feed bunks, as crop material bales are torn apart and fed out by the machine into the bunks.

Other advantges and attainments of the present invention will become apparent to those skilled in the art upon a reading of the following detailed description when taken in conjunction with the drawings in which there is shown and described an illustrative embodiment of the invention.

BRIEF DESCRIPTION OF THE DRAWINGS

In the course of the following detailed description reference will be frequently made to the attached drawings in which:

FIG. 3 is a plan view of the rear stack clamping mechanism of the machine on a larger scale than that of FIG. 1, showing the mechanism in its broken line open position and in its solid line closed, clamping position;

FIG. 4 is a fragmentary end elevational view of the left half of the rear stack clamping mechanism of FIG. 3 showing the mechanism in its open position;

FIG. 5 is a fragmentary side elevational view of the left side of the rear stack clamping mechanism showing in fragmentary form the load bed in its upright retrieving position with the rear stack clamping mechanism in its closed position in which it engages, clamps and supports the lower end of a stack of bales prior to retrieving the stack onto the load bed;

FIG. 6 is a fragmentary side elevational view of the forward end of the load bed of the machine on a larger scale than that of FIG. 1, showing the forward stack clamping mechanism it its stored position;

FIG. 7 is a fragmentary end elevational view of the left side of the forward end of the load bed of FIG. 6, but showing the forward clamping mechanism in its outwardly extended and upright open position ready for clamping a stack of bales during retrieving of the stack;

FIG. 8 is a fragmentary end elevational view taken along line 8—8 of FIG. 2, but showing the forward clamping mechanism in its inwardly retracted and closed position in which it engages and clamps the forward end of a stack of bales (which is the upper end of the stack prior to retrieving the stack onto the load bed);

FIG. 9 is a fragmentary side elevational view of FIG. 8;

FIG. 10 is a fragmentary end elevational view taken along line 10—10 of FIG. 1, showing the feeding and shredding mechanisms of the machine in their storage positions in which the mechanisms are disposed during road transport of the machine;

FIG. 11 is a view similar to that of FIG. 10, but showing the feeding and shredding mechanisms of the machine set up for the shredding operation;

FIGS. 13 through 18 are schematic representations of the machine of FIG. 1 showing the operations of the machine in tearing apart crop material bales.

DETAILED DESCRIPTION OF THE INVENTION

In the following description, right hand and left hand references are determined by standing at the rear of the machine and facing in the direction of forward travel. Also, in the following description, it is to be understood that such terms as "forward," "rearward," "left," "upwardly," etc. are words of convenience and are not to be construed as limiting terms.

IN GENERAL

Figure 1:
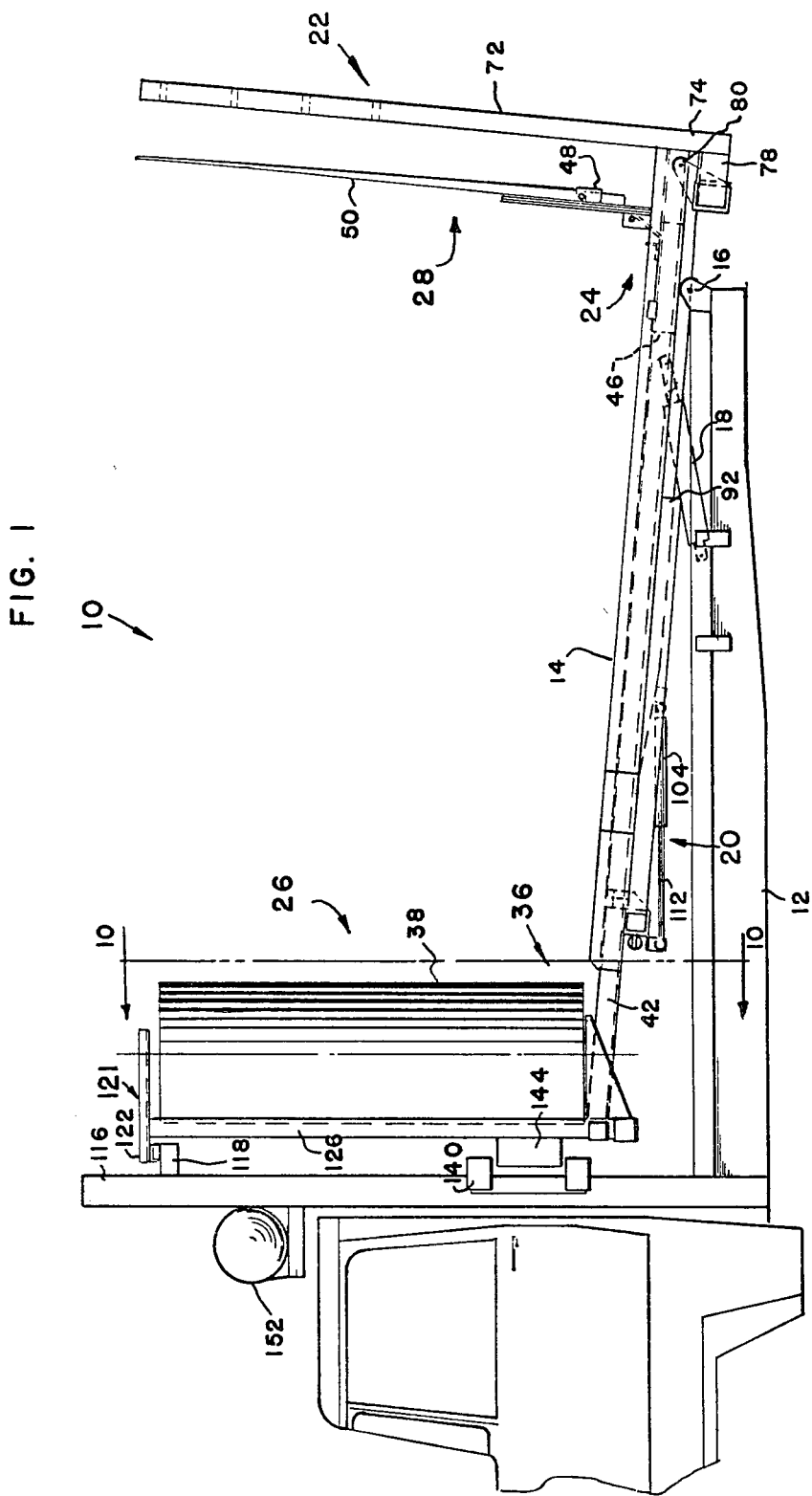
FIG. 1 is a side elevational view of a machine for tearing apart crop material bales embodying the principles of the present invention with portions of the chassis of the machine being omitted and showing the load bed of the machine in its horizontal position set up for feeding a stack of crop material bales longitudinally toward its forward end to the shredding mechanism.

Referring now to the drawings, and particularly to FIG. 1, there is shown a machine for tearing apart bales of crop material such as hay or the like, the machine being indicated generally by numeral 10 and forming the preferred embodiment of the present invention (the left side of the machine being shown in FIG. 1 when one is standing to the rear of the machine and facing in the direction of forward travel).

The machine 10 is provided with a mobile chassis, generally indicated at 12, being in the preferred embodiment a conventional truck chassis. However, the chassis may alternatively be of the pull-type form adapted to be secured to a tractor, or other towing vehicle, located at the front of the chassis.

Also, the machine 10 is provided with a load bed 14 being pivotally mounted at 16 near its rear end to the chassis 12. The load bed 14 is moveable upon contraction and extension of hydraulic cylinders, being pivotally mounted between the chassis 12 and the load bed 14 with only the left one being schematically shown at 18 in FIGS. 1 and 13, between a generally horizontal position, as seen in FIGS. 1 and 15, and a generally upright retrieving position in which, as readily seen in FIG. 13, the load bed may be disposed generally against a side of a bale stack S.

Stack clamping mechanisms, generally indicated at 20 and 22, are arranged respectively about the front and rear ends of the load bed 14. The mechanisms 20, 22 are operable for retaining the stack S against the load bed 14 when the load bed 14 is disposed in its upright position against the stack side, as shown in FIG. 13, and further during movement of the load bed 14 from its upright position to its horizontal position, as shown in FIG. 15.

Figure 2:
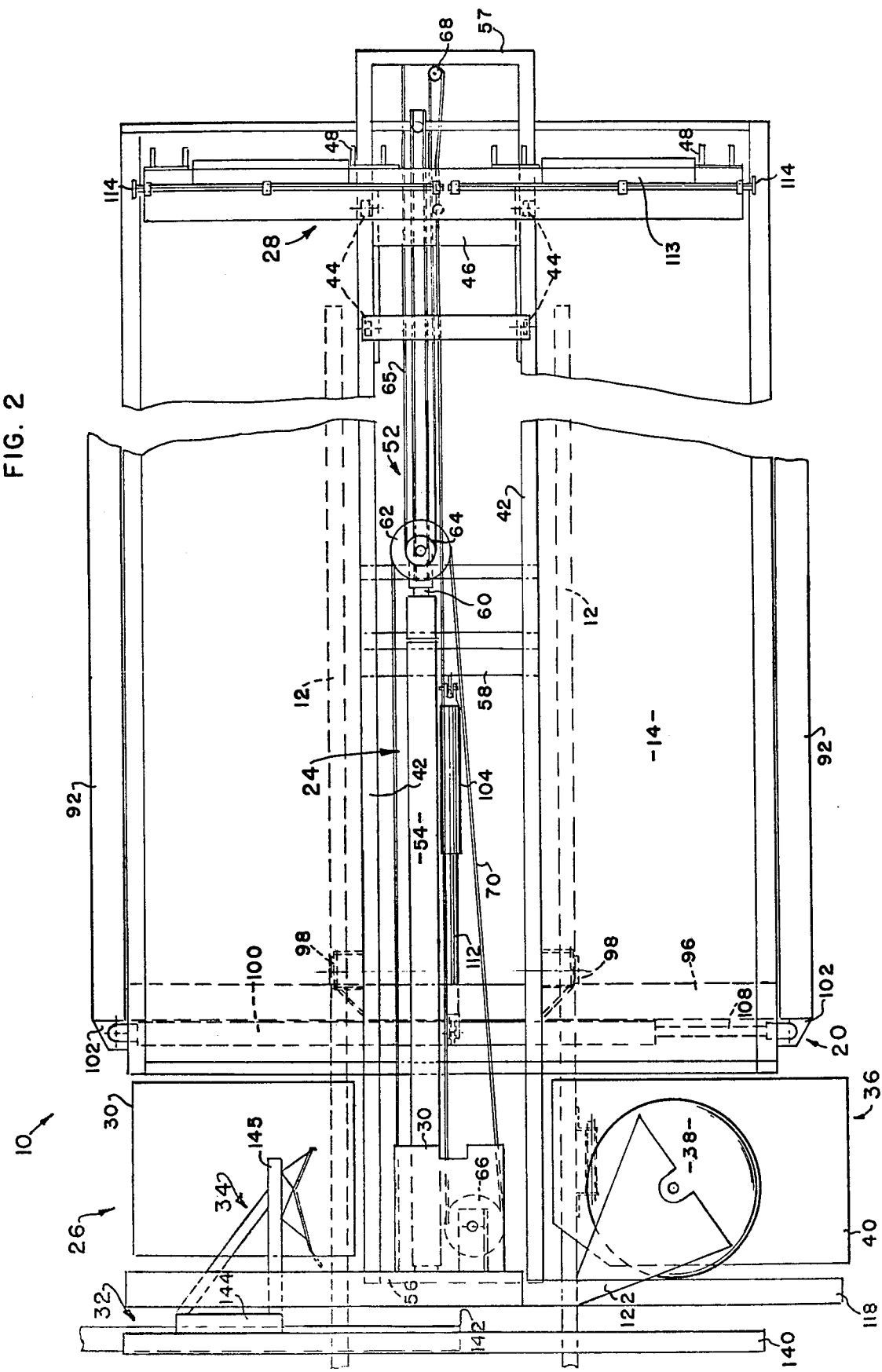
FIG. 2 is a plan view of the machine on a larger scale than that of FIG. 1, showing the load bed, the rolling rack mechanisms, the forward stack clamping mechanism and the feeding and shredding mechanisms of the machine, with the rear clamping mechanism of the machine being omitted.

A stack advancing mechanism, generally designated at 24 in FIG. 2, is mounted along the load bed 14 for moving the entire stack S longitudinally along the load bed 14 toward bale tearing means, generally indicated at 26, being mounted to the chassis 12 adjacent the front end of the load bed 14. Each forward movement of the stack S by a rolling rack 28 of the stack advancing mechanism 24 positions a leading stack portion, such as a leading vertically standing, transverse tier of bales, on a platform, indicated by numeral 30, of the bale tearing means 26.

A feeding mechanism 32 of bale tearing means 26 is disposed along the platform 30 and includes a pusher 34 which overlies the platform 30 and is moveable transversely to the load bed 14 between the right lateral side of the platform 30 and a shredding mechanism 36 of the bale tearing means 26 located adjacent the left lateral side of the platform. Movement of the pusher 34 toward a rotating upright shredding drum 38 of the shredding mechanism 36 causes endwise feeding of the longitudinally aligned, leading vertically standing tier of bales into the shredding drum 38.

A deflector shroud 40 partially surrounding and covering the shredding drum 38 confines the shredded, loose crop material so as to feed out the material onto a desired feeding location alongside the machine 10, as illustrated in FIG. 18.

STACK RETRIEVING OPERATION

Referring now to FIG. 2, the front stack clamping mechanism 20 and the feeding and shredding mechanisms 32, 36 (see also FIG. 10) are illustrated in respective storage positions for road transporting of the machine 10 to a stack storage location. Prior to retrieving or loading the stack S at the storage location, the rolling rack 28 must be moved to its extreme rear position along the load bed 14 and the front and rear clamping mechanisms 20, 22 actuated to their respective open positions, as will be explained hereinafter.

The stack advancing mechanism 24 includes a pair of spaced apart rails 42 mounted within the load bed 14 along the longitudinal middle thereof so as to define a longitudinal opening or slot between the front and rear ends of the load bed 14. The rails 42 are interconnected at their corresponding opposite ends by front and rear cross beams 56, 57, which rail ends extend respectively beyond the front and rear load bed ends, and define opposing facing longitudinal channels which each receive and confine a pair of rollers 44 rotatably mounted on outer opposite sides of a carriage frame 46 of the rolling rack 28. A transverse beam 48 of the rack 28 is affixed along the top rear end of the carriage frame 46 and rigidly mounts four laterally spaced apart upright holders 48 onto which are removably mounted fingers 50 (see FIG. 15).

A hydraulic cylinder and cable assembly 52 is also mounted between the rails 42 for moving the rolling rack 28 forwardly and rearwardly along the load bed 14. The assembly 52 includes a hydraulic cylinder 54 being mounted by front and intermediate cross beams 56, 58 which interconnect rails 42 and having a piston rod 60 with large and small diameter sheaves 62, 64 being concentrically and rotatably mounted to the terminal end of the rod 60. The rod end is moveably guided on a track 65 mounted parallel to the rails 42. The assembly 52 further includes front and rear sheaves 66, 68 respectively rotatably mounted to cross beams 56, 57 at the opposite ends of the rails 42. Also, the assembly includes a cable 70 being attached at one end to front cross beam 56, extending therefrom rearwardly and around the large diameter sheave 62, extending therefrom forwardly and around the front sheave 66, extending rearwardly again to the carriage frame 46 of the rolling rack 28 where a short section of the cable 70 is affixed, extending on rearwardly from the carriage frame 46 and around the rear sheave 68, extending therefrom back forwardly and around the small diameter sheave 64, and finally extending rearwardly again to rear cross beam 57 where the other end of the cable 70 is attached.

Therefore, the rolling rack 28 is interconnected to the hydraulic cylinder 54 via the cable 70. The hydraulic cylinder 54, being of the double acting type and operated through actuation of suitable hydraulic controls (not shown), upon movement of its piston rod 60 rearwardly to its completely extended position will move the rolling rack 28 to the forward end of the load bed 14 near the front ends of rails 42. Also, upon complete contraction of its rod 60 (the rod being illustrated in FIG. 2 almost completely contracted within the hydraulic cylinder with the rolling rack 28 positioned near the rear end of the load bed 14), the hydraulic cylinder will move the rolling rack 28 to adjacent the rear ends of rails 42 just beyond the rear end of the load bed 14. The rolling rack 28 is moved to the latter position just prior to pivoting of the load bed 14 to its upright retrieving position.

During road transporting of the machine 10, the rolling rack is maintained in the position shown in FIG. 2 just forwardly of the rear load bed end. The reason for placing the rolling rack in such position is that also during road transporting of the machine 10, the rear stack clamping mechanism 22 must be disposed in its closed position, as illustrated in FIG. 3, so that its upright arms 72 do not project laterally beyond the overall machine width. Thus, if the rolling rack 28 was disposed at its extreme rear position, it would likely interfere with the arms 72 of the closed clamping mechanism 22.

As illustrated in FIG. 1, and in more detail in FIGS. 3 through 5, the rear stack clamping mechanism 22 includes the pair of arms 72, each having an elongated upstanding portion 74 which extends upwardly past one rear corner of the load bed 14 and is pivotally mounted to one of the opposite ends of a support pipe 76 extending below and transversely across the rear end of the load bed 14 by a short transverse portion 78 of the arm 72 fixed to the lower end of its upstanding portion 74. The support pipe 76 is, in turn, pivotally mounted at 80 to each of the rails 42 near the rear ends thereof, as seen in FIGS. 1 and 5, about an axis which extends generally perpendicular to each of the pivotal axes of the arms 72 relative to the pipe 76. A pair of hydraulic cylinders 82 are each pivotally mounted to brackets 84, 86 respectively fixed on one of the short transverse arm portions 78 and on the support pipe 76. Extension and contraction of the hydraulic cylinders 82 by actuation of suitable hydraulic controls (not shown) move the arms 72 between their broken line open positions and solid line closed positions, as illustrated in FIG. 3.

When the arms 72 are pivoted to their closed positions, the combined center of gravity of the support pipe 76 and the arms 72 is located rearwardly of the pivot point 80. Consequently, the pipe 76 and arms 72 tend to want to rotate clockwise, when viewed from the left side of the machine 10 as shown in FIGS. 1 and 5, about pivot point 80. However, the pipe 76 abuts up against the underside of rails 42, as clearly illustrated in FIG. 5, to prevent such rotation and accordingly maintains the arms 72 in a generally upright disposition perpendicular to the load bed 14.

As the arms 72 pivot from their closed positions to their open positions, the combined center of gravity of the support pipe 76 and the arms 72 shifts to a location forwardly of the pivot point 80. Consequently, then the pipe 76 and arms 72 tend to want to rotate counterclockwise about pivot point 80. Such rotation is permitted through a short arc of movement, until the pipe 76 engages a stop (not shown), in order to facilitate selected placement of the arms 72 at any one of a number of angular positions relative to the load bed and against the stack S, such as the one position shown in FIG. 13, by utilization of chains 88 having a selected length and being attached between the top ends of the arms 72 and near the front corners of the load bed 14 along respective sides of the stack. This ability to effect placement of the arms 72 at any one of a number of angular positions facilitates retrieving stacks having slightly differing angles of lean at the base of the stack.

As stated hereinabove, the arms 72 are disposed in their closed positions during road transporting of the machine 10. In setting up the machine for retrieving, the machine is backed up near one side of the stack and the arms 72 are moved to their open positions. Then the rolling rack 28 is moved to its extreme rear position. Next, the load bed 14 is pivotally raised approximately 45 to 60 degrees to facilitate removal of the fingers 50 from their respective 48. The fingers 50 are removed because difficulty has been encountered in attempting to retrieve a stack by driving the rolling rack fingers underneath the stack. Oftentimes because of traction problems on soft ground, it is not possible to drive the fingers all the way under the stack.

After the fingers 50 have been removed, pivotal movement of the load bed 14 is continued to place the load bed in its upright position. Then, the machine 10 is backed against the stack side which positions the short finger-like holders 48 of the rolling rack 28 under the stack S with the load bed 14 engaging the stack side, as illustrated in FIG. 13. Next, the arms 72 are pivotally moved toward their closed positions by actuating hydraulic cylinders 82 until the arms 72 tightly embrace the lower tier of bales of the stack to be retrieved with the four teeth members 90 projecting from each of the arms 72 being impaled into the bales and the chains 88 being tightly drawn against the opposite sides of the stack.

Retention of the stack S against the load bed 14 is completed by actuation of the front stack clamping mechanism 20.

Referring to FIGS. 1 and 2, and more particularly to FIGS. 6 through 9, the mechanism 20 includes a pair of elongated arms 92 each having a lower transverse square pipe section 94 being telescopically received within one of the opposite ends of a hollow elongated square-shaped pipe 96 which extends in a transverse relation to the load bed 14 and is pivotally mounted at points 98 to the rails 42 below and near the forward end of the load bed 14. A hydraulic cylinder 100 extends transversely across the underside of the front load bed end between the lower ends of arms 92 and is pivotally connected at its cylinder and piston rod ends respectively to brackets 102 fixed to the arms 92. A longitudinally-extending hydraulic cylinder 104 is pivotally connected at its cylinder end to intermediate cross beam 58 and at its piston end to a bracket 106 fixed at the middle of the underside of the transverse pipe 96.

Actuation of the transverse hydraulic cylinder 100 through suitable hydraulic controls (not shown) so as to extend its piston rod 108 moves both arms 92 from their stored positions outwardly relative to the opposite sides of the load bed 14 until complementary stops 110 fixed respectively on the pipe sections 94 and on the ends of the pipe 96 about each other, as shown in FIG. 7. Then, actuation of the longitudinal hydraulic cylinder 104 through suitable hydraulic controls (not shown) so as to contract its piston rod 112 pivotally moves the pipe 96 counterclockwise about points 98, as viewed in FIG. 6, to swing arms 92 upwardly from their generally horizontal position of FIGS. 1 and 6 to their upright positions of FIG. 7. Then, actuation of transverse hydraulic cylinder 100 so as to contract its piston rod 108 returns both arms 92 to closed positions against the opposite load bed sides.

The above-outlined procedure for moving the arms 92 of the front stack clamping mechanism 20 from their stored positions to their closed positions is followed during stack retrieving for clamping the sides of the upper end of the stack S, as shown in FIG. 13 to complete the retention of the stack against the load bed 14. Further, once the arms 92 clamp against the stack, the longitudinal hydraulic cylinder 104 may be actuated so as to cause the arms 92 to swing downwardly slightly and tighten the stack against the arms 72 of the rear stack clamping mechanism 22.

Next, the machine 10 is driven at a creeping pace forwardly as the load bed 14 is lowered from its upright position of FIG. 13 to its horizontal position of FIG. 15 so that the stack being loaded will not interfere with the bales of the stack remaining at the storage location. Once the load bed 14 assumes its horizontal position, the fingers 50 maybe inserted onto the holders 48 of the rolling rack 28 as follows. First, the respective arms 72, 92 of the rear and front clamping mechanisms 22, 20 are moved to their open positions. Next, the rolling rack 28 is moved forwardly for approximately six inches and then returned to its extreme rear position in order to provide sufficient clearance between the stack and the holders 48 for insertion of the fingers 50 thereon. Also, frequently, prior to insertion of the fingers 50 onto holders 48, the last tier of bales may need to be slightly adjusted so as not to interfere with the placement of the fingers 50 onto the holders 48. Further, adjustment of the last tier of bales relative to the rolling rack will facilitate subsequent transverse movement of the final tier relative to the rolling rack as it is being fed into the shredding drum 38. A pivotal, inclined plate 113 mounted along the forward side of the rolling rack 28, as shown in FIG. 2, may be pivoted by using a short lever 114 fixed at each end of the plate 113 in order to assist in adjusting the final tier so as to dislodge it from the ends of the holders 48.

Finally, after the fingers 50 have been inserted, the arms 72, 92 may be returned to their closed positions against the stack and the machine 10 with the stack S retained on the load bed 14 transported to a desired feeding location.

STACK ADVANCING AND BALE TIER FEEDING AND SHREDDING OPERATIONS

In order to set up the machine 10 for tearing apart bales into loose form at the feeding location, the feeding and shredding mechanism 32, 36 must be changed from their respective storage positions, as shown in FIGS. 2 and 10, to their respective operating positions, as shown in FIGS. 11 and 16.

A pair of spaced apart channels 116 are mounted to the chassis 12 and extend upright therefrom. An upper support track 118 is transversely fixedly mounted near the upper ends of the channels 116 and extends laterally of the left channel 116. A lower support track 120 is fixedly mounted to the chassis 12 to extend transversely thereacross and beyond its left side. A carriage 121 for the shredding drum 38 is comprised by upper slide member 122 and lower slide member 124 which members are slideably movable respectively along the upper and lower support tracks 118, 120. Upright post 126 fixedly interconnects the members 122, 124. The lower slide member 124 is moveably supported on roller 128 rotatably mounted on bracket 130 fixed to lower track 120 and between spaced apart rollers 132 rotatably mounted to left upright channel 116. The shredding drum 38 is rotatably mounted at its upper and lower ends respectively to the upper and lower slide members 122, 124. A hydraulic cylinder 134 is coupled to the right upright channel 116 and the lower slide member 124 near its left end. Actuation of the hydraulic cylinder 134 through suitable hydraulic controls will move the carriage 121 and the shredding drum 38 between the inner transport, position of FIG. 10 and the outer operating position of FIG. 11. A left one of the platform members 30 is hinged along its inner side (not shown) and must be pivoted upwardly and toward the right side of the machine 10 before the shredding drum 38 may be moved to its transport position. Also a front left vertical wall 136 which is mounted along one vertical side to the upright post 126 telescopes along and forwardly of a front right vertical wall 138, being mounted to the rear sides of the channels 116, as the shredding drum 38 and carriage 121 are moved to the transport or storage position.

The feeding mechanism 32 includes a stationary track frame 140 mounted transversely across the rear sides of the channels 116 adjacent to and above the platform 30 and open at its right end for receiving a telescoping feeder track 142. The track 142 is moveably mounted to frame 140 and itself moveably mounts a feeder carriage 144 having upper and lower pairs of spaced apart rollers which run respectively along upper and lower channels defined in the track 142. The carriage 144 vertically mounts a pusher arm having a V-shaped bale engaging surface along its left vertical side.

Figure 12:
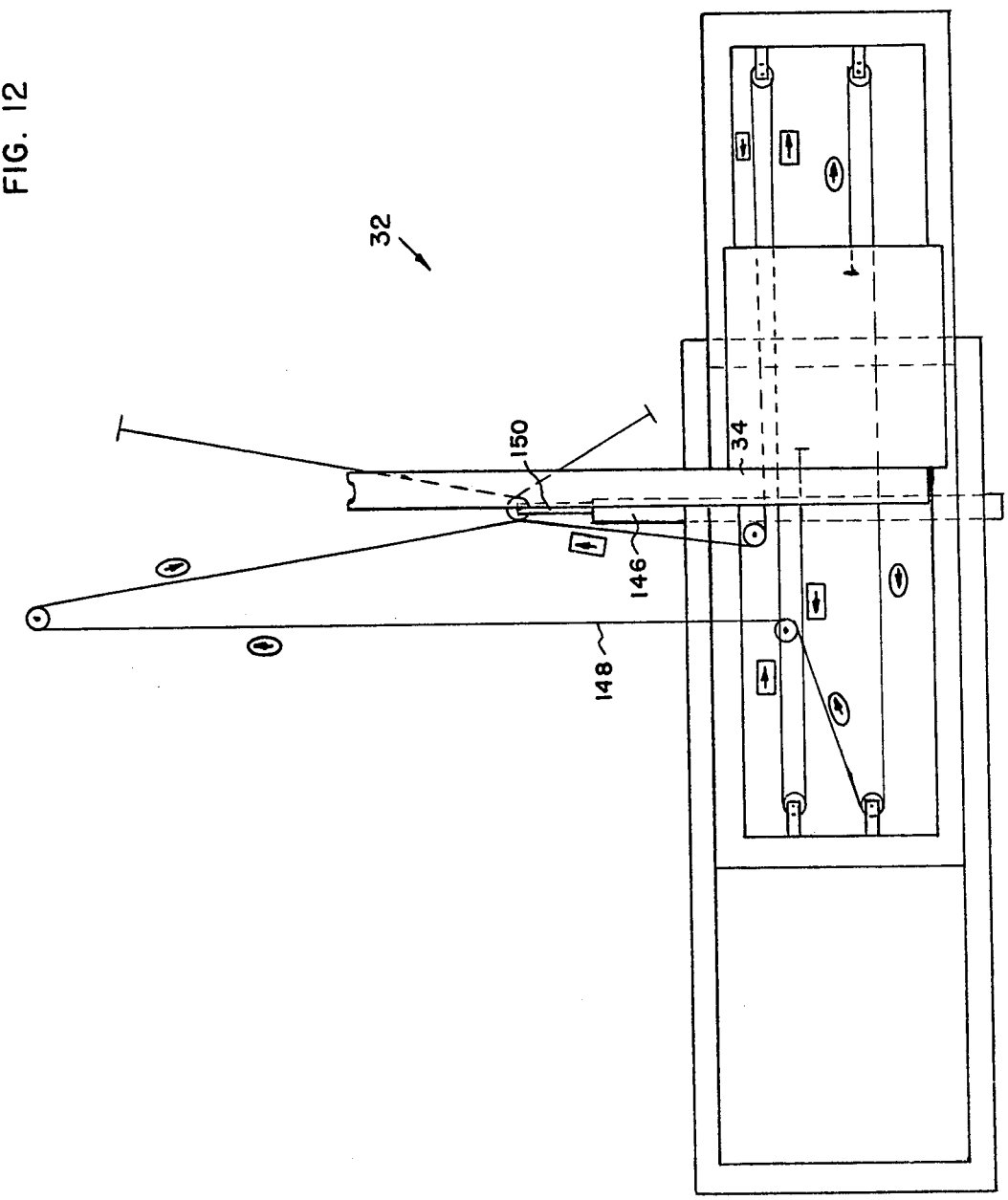
FIG. 12 is a schematic representation of the hydrical cylinder and cable assembly for moving the pusher of the feeding mechanism.

FIG. 12 schemically depicts the hydraulic cylinder and cable assembly for moving both the track 142 and the carriage 144 toward and away from the shredding drum 38 and relative to the stationary track 140. A hydraulic cylinder 146 is vertically mounted to the right upright channel 116 and is interconnected by a cable 148 to the carriage 144. The cable 148 is affixed at its opposite ends to the left channel 116, extended about a plurality of sheaves being rotatably mounted respectively at opposite ends of the telescoping track 142 and to the left channel 116 and affixed at a short middle section to the carriage 144.

Whenever the hydraulic cylinder 146 is actuated through suitable hydraulic controls (not shown) so as to extend its piston rod 150 upwardly, the cable 148 is pulled along the path designed by the boxed arrows which pulls the carriage 144 to the left toward the shredding drum 38. The telescoping track 142 will move leftward with the carriage 144 when the carriage 144 has reached the left side of the track 142. When the piston rod 150 of cylinder 146 is contracted downwardly, the cable 148 is pulled along the reverse path designated by the circled arrows which pulls the carriage 144 to the right away from the shredding drum 38. The telescoping track 142 will move rightward with the carriage when the carriage 144 has reached the right side of the track 142, and together they move to a position laterally beyond the right side of the platform 30 and outside of the overall width of the machine 10.

FIG. 16 illustrates the feeding and shredding mechanism 32, 36 set up in their respective operating positions and the front and rear clamping mechanisms 20, 22 in their respective open positions. Also the loose crop material deflector shroud 40, which is positioned partially about the shredding cylinder 38 and pivotally mounted to the left end of the upper support track 118 in any suitable manner (not shown), is pivoted such that its open bottom end extends laterally outwardly to the left of the drum 38, as seen in FIGS. 16 through 18, and is retained in such outwardly position by the use of any suitable support means (not shown). Therefore, the machine 10 is now in condition for carrying out the operations involved in tearing apart bales.

First, the stack is moved forwardly along the load bed 14 by the rolling rack 28 until the leading tier of bales is placed upon the platform 30 and in alignment with the shredding drum 38 and the pusher arm 145. Then, a hydraulic motor (not shown) located below the shredding drum 38 is operated through suitable hydraulic controls (not shown) to rotate the drum 38 in a counterclockwise direction, as viewed in FIGS. 17 and 18. The arms 92 of the front clamping mechanism 20 are engaged with the next leading tier of bales to prevent lateral dislocation of this tier as the leading tier is fed laterally into the shredding drum 38 by the pusher arm 145. Preferably, the pusher arm 145 is moved toward the rotating drum 38 at a variable low rate of speed in order to control the rate of discharge of the loose, shredded crop material and, also, to prevent the drum drive from stalling out. The material binding the bales in the vertical tier, such as plastic twine, is severed by the angular shredding elements (FIG. 11) fixed on the outer surface of the drum 38 and fed out with the loose crop material. The shroud 40 confines the shredded crop material so as to feed it out at the desired feeding location. Further, water supplied in any suitable manner from a tank 152 may be selectively sprayed on the shredded material to cut down on the dust. After the pusher arm 145 has been moved completely to the left adjacent the drum and the bales of the leading tier shredded by the drum 38, the pusher arm 145 is returned to its extreme right position and the aforementioned steps are repeated again to advance, feed and shred each successive leading tier of bales until the entire stack has been torn apart and fed out.

It is thought that the invention and many of its attendant advantages will be understood from the foregoing description and it will be apparent that various changes may be made in the form, construction and arrangement of the parts of the machine decribed and that changes may be made in the steps of the method described and their order of accomplishment without departing from the spirit and scope of the invention or sacrificing all of its material advantages, the form hereinbefore described being merely a preferred or exemplary embodiment thereof.

Having thus described the invention, what is claimed is:

1. In a machine for tearing apart crop material bales from a stack thereof, the combination comprising:
   a mobile chassis;
   a load bed pivotally mounted near its one end to said chassis and moveable between a generally horizontal position and a genrally upright retrieving position in which said load bed may be disposed generally against a side of said bale stack, said one end being the rear end with respect to the primary direction of travel of the machine;

stack retaining means including a pair of stack supporting arms mounted to said load bed and extending in a generally upright relation therefrom respectively adjacent opposing corners of said one end thereof, said arms being operable for movement between respective open positions disposed outwardly from opposite lateral sides of a lower end of said stack and respective closed positions disposed in supporting engagement with said stack lower end when said load bed is disposed in its upright stack retrieving position, and a pair of stack clamping arms mounted to said load bed and extensible in a generally upright relation therefrom respectively adjacent opposing corners of said other opposite end thereof, said arms being operable for movement between respective open positions disposed outwardly from opposite lateral sides of an upper end of said stack and respective closed positions disposed in clamping engagement with said stack upper end when said load bed is disposed in its upright stack retrieving position;

means mounted on said load bed for advancing said stack longitudinally along said load bed toward an opposite other end of said load bed opposite to its one end when said load bed is disposed in its horizontal position;

a generally horizontally-positioned platform mounted on said chassis adjacently along said other end of said load bed when said load bed is disposed in its horizontal position, said platform capable of receiving and supporting a leading portion of said stack each time said stack advancing means advances said stack longitudinally along said load bed;

a crop material bale shredder operatively mounted on said chassis adjacent one lateral side of said platform; and feeder means mounted to said chassis along said platform and moveable toward said shredder for feeding said leading stack portion along said platform in a transverse relation to the longitudinal extent of said load bed and into said shredder.

2. The combination as recited in claim 1, wherein said feeder means comprises:

track means mounted on said chassis along said platform oppositely from said load bed and extending between said one lateral side and an opposite other lateral side of said platform; and pusher means mounted on said track means to extend outwardly therefrom toward said load bed in overlying relation to said platform, said pusher means being moveable along said track means between a position adjacent said opposite other lateral platform side remote from said shredder wherein said leading stack portion may be positioned between said pusher means and said shredder and a position adjacent said shredder such that in moving to said latter position toward said shredder from said position remote therefrom said pusher means feeds said leading stack portion into said shredder.

3. The combination as recited in claim 1, further comprising:

shroud means positioned partially about said shredder for confining the shredded crop material so as to feed said material out from said shredder at a predetermined location about said shredder.

4. The combination as recited in claim 1, wherein said shredder extends in a generally upright relation to said platform and is rotatably mounted about a vertical axis.

5. The combination as recited in claim 1, wherein said shredder is disposed adjacent said one lateral side of said platform and extending outwardly beyond the overall machine width when in use, said shredder being moveable to a storage position within the overall machine width when not in use for facilitating road transporting of said machine.

6. The combination as recited in claim 5, wherein said shredder is rotatably axially mounted on movable track means which are fixed to said chassis; and hydraulic means are operably connected between said chassis and said movable track means whereby, through actuation of said hydraulic means, said shredder may be selectively moved between positions of storage and use.

7. In a machine for tearing apart crop material bales from a stack thereof, the combination comprising:

a mobile chassis;

a load bed pivotally mounted near its one end to said chassis and moveable between a generally horizontal position and a generally upright retrieving position in which said load bed may be disposed generally against a side of said bale stack, said one end being the rear end with respect to the primary directon of travel of the machine;

means arranged about said load bed and operable for retaining said stack against said load bed when said load bed is disposed in its upright position against said stack side and is moved from its upright position to its horizontal position;

means mounted on said load bed for advancing said stack longitudinally along said load bed toward an opposite other end of said load bed opposite to its one end when said load bed is disposed in its horizontal position;

a generally horizontally-positioned platform mounted on said chassis adjacently along said other end of said load bed when said load bed is disposed in its horizontal position, said platform capable of receiving and supporting a leading portion of said stack each time said stack advancing means advances said stack longitudinally along said load bed;

a crop material bale shredder rotatably axially mounted on movable track means which are fixed to said chassis adjacent one lateral side of said platform and extending beyond the overall machine width when in use;

hydraulic means operably connected between said chassis and said movable track means whereby, through actuation of said hydraulic means, said shredder may be selectively moved between positions of storage and use; and feeder means mounted to said chassis along said platform and moveable toward said shredder for feeding said leading stack portion along said platform in a transverse relation to the longitudinal extent of said load bed and into said shredder.

8. The combination as recited in claim 7, further comprising:

shroud means positioned partially about said shredder for confining the shredded crop material so as to feed said material out from said shredder at a predetermined location about said shredder.

9. The combination as recited in claim 7, wherein said shredder extends in a generally upright relation to said platform and is rotatably mounted about a vertical axis.

10. The combination as recited in claim 7, wherein said shredder is disposed adjacent said one lateral side of said platform and extending outwardly beyond the overall machine width when in use, said shredder being moveable to a storage position within the overall machine width when not in use for facilitating road transporting of said machine.

* * * * *